(12) United States Patent
Kang et al.

(10) Patent No.: US 7,540,322 B2
(45) Date of Patent: Jun. 2, 2009

(54) AIR CONDITIONER FOR VEHICLE

(75) Inventors: Sungho Kang, Daejeon-si (KR);
Sangchul Byon, Daejeon-si (KR);
Yongeun Seo, Daejeon-si (KR);
Yongsang Kim, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 537 days.

(21) Appl. No.: 11/152,602

(22) Filed: Jun. 14, 2005

(65) Prior Publication Data
US 2006/0000594 A1    Jan. 5, 2006

(30) Foreign Application Priority Data
Jun. 18, 2004    (KR) .................... 10-2004-0045399

(51) Int. Cl.
*B60H 1/00* (2006.01)
(52) U.S. Cl. .................... 165/203; 165/202; 62/244
(58) Field of Classification Search ............ 165/41, 165/42, 43, 44, 202, 203, 204; 62/244; 454/161
See application file for complete search history.

(56) References Cited
U.S. PATENT DOCUMENTS
5,673,964 A * 10/1997 Roan et al. ............. 454/161

2004/0093885 A1 * 5/2004 Ito et al. .................... 62/244

FOREIGN PATENT DOCUMENTS
JP    2000-168338    6/2000
KR    10-2001-0059264 A    7/2001

* cited by examiner

*Primary Examiner*—Ljiljana (Lil) V Ciric
(74) *Attorney, Agent, or Firm*—Fulbright & Jaworski L.L.P.

(57) ABSTRACT

The present invention relates to an air conditioner for vehicle including a front seat air conditioning unit and a rear seat air conditioning unit. The rear seat air conditioning unit has a rear seat air conditioning casing provided with a rear seat evaporator disposed in generally horizontal direction to air flow passages therein, with a rear seat heater core disposed over the rear seat evaporator, with vent outlets and floor outlets disposed on the upper and lower portions of the exit end thereof for discharging the air flowing from the air conditioner to the rear seats of the vehicle, with a rear seat partition wall adapted to divide the air flow passages into two areas, with rear seat temperature doors disposed between the rear seat evaporator and the rear seat heater core, for adjusting the temperatures of the divided areas by the rear seat partition wall, with rear seat mode doors disposed adjacent to the vent outlets and the floor outlets for controlling the degree of opening of the vent outlets and the floor outlets, and with a rear seat blower housed at one side thereof for blowing the air to the rear seat air conditioning casing.

8 Claims, 12 Drawing Sheets

AIR CONDITIONER FOR VEHICLE

This application claims priority from Korean Patent Application No. 10-2004-0045399 filed Jun. 18, 2004, hereby incorporated by reference.

BACKGROUND OF THE INVENTION

1. Field of the Invention

The present invention relates to an air conditioner for a vehicle that is used to conduct heating and cooling for front and rear seats inside the vehicle, and more particularly, to a multi-zone type air conditioner for a vehicle that enables a rapid temperature control, and can independently control the temperature of front and rear areas and left and right areas inside the vehicle.

2. Background of the Related Art

Typically, a vehicle is provided with an air conditioner that heats or cools internal and external air to supply or circulate the heated or cooled air to the interior thereof, thereby keeping the air inside the vehicle at an appropriate temperature and making occupants inside the vehicle feel good. The air conditioner generally includes a casing in which a plurality of air flow passages are formed therein, a blower disposed at one side of the casing for absorbing the internal and external air in/from the vehicle to blow the air to the casing, an evaporator for making the internal and external air flowing therein cool, and a heater core for heating the internal and external air.

Such the air conditioner for a vehicle is provided with a cooling device that is constructed such that refrigerants, which are compressed by means of a compressor that is driven by power of an engine, which are passed through a condenser, an expansion valve and the evaporator, and which flow into the compressor again, are heat-exchanged with the internal and external air by the blower to keep the air in the interior of the vehicle cool, and with a heating device that is constructed such that the cooling water, which is used to keep the engine cool, which is passed through the heater core, and which is returned to the engine, is heat-exchanged with the internal and external air flowing out by the blower to keep the air in the interior of the vehicle heated.

In the conventional air conditioner for the vehicle, however, vent outlets and floor outlets that supply the air from the air conditioner to the interior of the vehicle are disposed on the front sides of the front seats, which makes the cooling and heating efficiencies for the rear seats substantially low.

To solve the above-mentioned problems, there is provided Korean Publication No. 2001-0059264 that is filed by the same applicant as the present invention, in which a main air conditioner is provided with an auxiliary air conditioning unit that is operated independently of the main air conditioner in order to efficiently achieve the cooling and heating for the rear seats.

FIG. 1 is a schematic view of showing a conventional air conditioner for a vehicle, and FIG. 2 is a sectional view of showing an auxiliary air conditioner used for the conventional air conditioner for the vehicle. The main air conditioner Ma blows air through wind shield openings 292'a and 292'b, center and side openings 291'a and 291'b, and floor openings 293'a and 293'b, and the auxiliary air conditioner Aa blows air through vent outlets 9a and 9b and floor outlets 10a and 10b.

According to the prior art, the auxiliary air conditioner Aa is separately mounted from the main air conditioner Ma on a console space portion for the vehicle, in order to efficiently execute the cooling and heating for the rear seats. The auxiliary air conditioner Aa includes an evaporator and a heater core, having working fluids like refrigerants that branched from the main air conditioner and flow into the interior thereof to execute the heat exchange with the internal and external air. At this time, the supply of the working fluid is controlled by means of a solenoid valve or a water valve such that the temperature of the air from the air conditioner can be adjusted.

According to the prior art, however, the control of temperature of the air from the air conditioner is made by permitting or stopping the supply of the working fluids such that because of the continuously flowing characteristic of the fluid the temperature of air from the air conditioner is not rapidly changed in response to the manipulation of a user, thereby inevitably causing the delay of time for the temperature change. For instance, in a case where cooling is needed in the process of heating, the temperature change is not made rapidly because of the cooling water remaining in the heater core, and therefore, a predetermined period of time elapses before the cool air flows out.

To solve the above-mentioned problems, thus, it is possible to mount an auxiliary air conditioning unit on the left and right sides of the rear portion of the vehicle, respectively, for executing the temperature control independently of each other, but in this case, the evaporator and the heater core are separated to the left and right sides, such that it is necessary to form a plurality of flow passages through which the refrigerants and cooling water flow in and out that are connected from the main air conditioner positioned at the front of the vehicle to the auxiliary air conditioning units positioned at the rear thereof. This causes the whole installation space of the air conditioner to be bulky and makes the number of working processes and the manufacturing cost due to the increase of the number of parts substantially raised.

SUMMARY OF THE INVENTION

Accordingly, the present invention has been made in view of the above-mentioned problems occurring in the prior art, and further, an object of the present invention is to provide a multi-zone type air conditioner for a vehicle that enables a rapid temperature control, and can independently control the temperature of front and rear areas and left and right areas inside the vehicle.

Another object of the present invention is to provide an air conditioner for a vehicle that can efficiently cool and heat the rear seat side of the vehicle, enables a rapid temperature change of the air flowing from the air conditioner, decreases the resistance of air flow passages, and improves the heating performance.

To accomplish the above objects, according to the present invention, there is provided an air conditioner for a vehicle including: a front seat air conditioning unit having a front seat air conditioning casing provided with a front seat evaporator and a front seat heater core disposed on air flow passages therein, with vent outlets, defrost outlets and floor outlets disposed at an exit end thereof for discharging the air flowing to the front seats of the vehicle, with a front seat partition wall for dividing the air flow passages into two areas, with front seat temperature doors for individually controlling the temperatures of the two areas divided by the front seat partition wall, with front mode doors for controlling the degree of opening of the vent outlets, the defrost outlets and the floor outlets and with the front seat blower for blowing the air to the front seat air conditioning casing; and a rear seat air conditioning unit having a rear seat air conditioning casing provided with a rear seat evaporator disposed in substantially in the horizontal direction to air flow passages therein, with a rear seat heater core disposed on the upper side of the rear seat evaporator, with vent outlets and floor outlets disposed at an exit end thereof for discharging the air flowing to the rear seats of the vehicle, with a rear seat partition wall for dividing the air flow passages into two areas, with rear seat temperature doors disposed between the rear seat evaporator and the rear seat heater core, for individually controlling the temperatures of the divided areas by the rear seat partition wall, with rear seat mode doors disposed adjacent to the vent outlets and the floor outlets for controlling the degree of opening of the vent outlets and the floor outlets, and with a rear seat blower for blowing the air to the rear seat air conditioning casing, whereby in a heating mode, air flows into the upper side portion of the rear seat heater core while passing through the rear seat heater core so as to be discharged to the rear seats of the vehicle.

Upon a heating mode, preferably, the air flows upwardly of the rear seat heater core, is passed through the rear seat heater core, and is discharged therefrom.

According to the present invention, preferably, the opening and closing of the vent outlets and the floor outlets of the rear seat air conditioning casing are controlled by the rear seat mode doors formed in the divided two areas.

According to the present invention, preferably, the air conditioner for a vehicle further includes sub-temperature doors that are operated cooperatively with the rear seat temperature doors.

The rear seat temperature doors are pivot doors each having a rotary shaft formed in the inner side of a door plate.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

According to the present invention, an air conditioner for a vehicle includes a front seat air conditioning unit and a rear seat air conditioning unit, and an explanation of each of them is given below.

Figure 3:
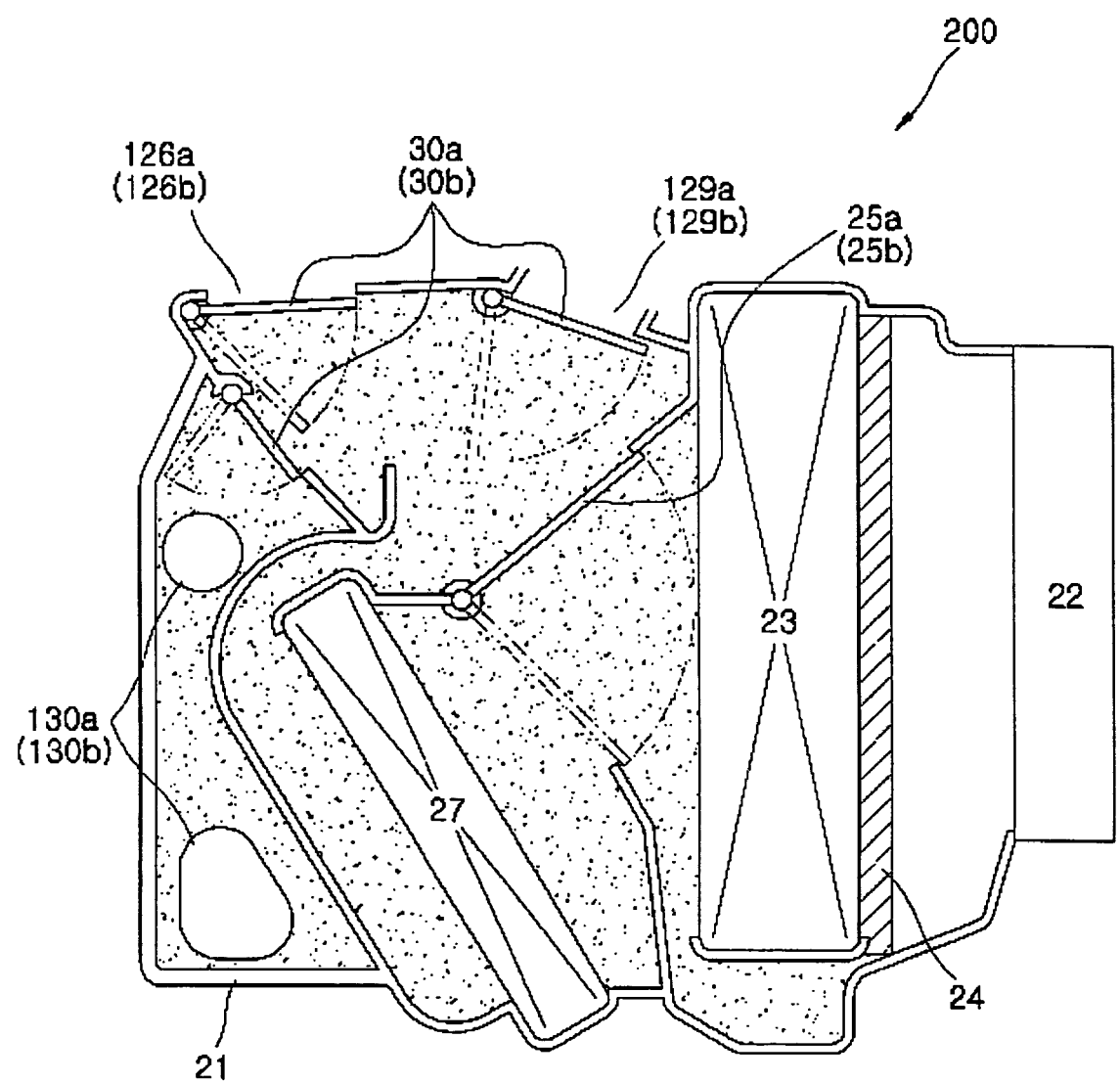
FIG. 3 is a sectional view of showing a front seat air conditioning unit constructed according to an embodiment of the present invention.

FIG. 3 is a sectional view of showing a front seat air conditioning unit constructed according to an embodiment of the present invention. As shown, a front seat air conditioning unit 200 includes a front seat air conditioning casing 21 in which a plurality of air flow passages are arranged, a front seat blower 22 disposed in the front seat air conditioning casing 21, a front seat evaporator 23 and a front seat heater core 27 for cooling and heating the internal and external air in/from the air conditioner, and front seat mode doors 30a and 30b for opening and closing the outlets 126a, 126b, 129a, 129b, 130a, and 130b formed at the exit end of the front seat air conditioning casing 21.

A front seat blower 22 that is disposed at the entry end of the front seat air conditioning casing 21 flows the internal and external air in/from the air conditioner therein to thereby control the air flow of the interior of the front seat air conditioning unit 200. A front seat partition wall 24 is formed at the downstream of the front seat blower 22, for dividing the space formed by the front seat air conditioning casing 21 in which air flows into left and right areas that work independently of each other, such that the internal and external air is sent to the divided two areas, respectively and is blown thereto.

The internal and external air is sent to the front seat evaporator 23 and heat-exchanged with refrigerants by means of the front seat evaporator 23. After that, the refrigerants are circulated through a compressor, a condenser, and an expansion valve (which are not shown) in a cycle of evaporation, compression, condensation, and expansion.

The internal and external air that is passed through the front seat evaporator 23 is heat-exchanged with high temperature of cooling water by means of the front seat heater core 27 in response to the opening or closing of the front seat temperature doors 25a and 25b formed at the upstream of the front seat heater core 27, such that it becomes warm air.

Figure 1:
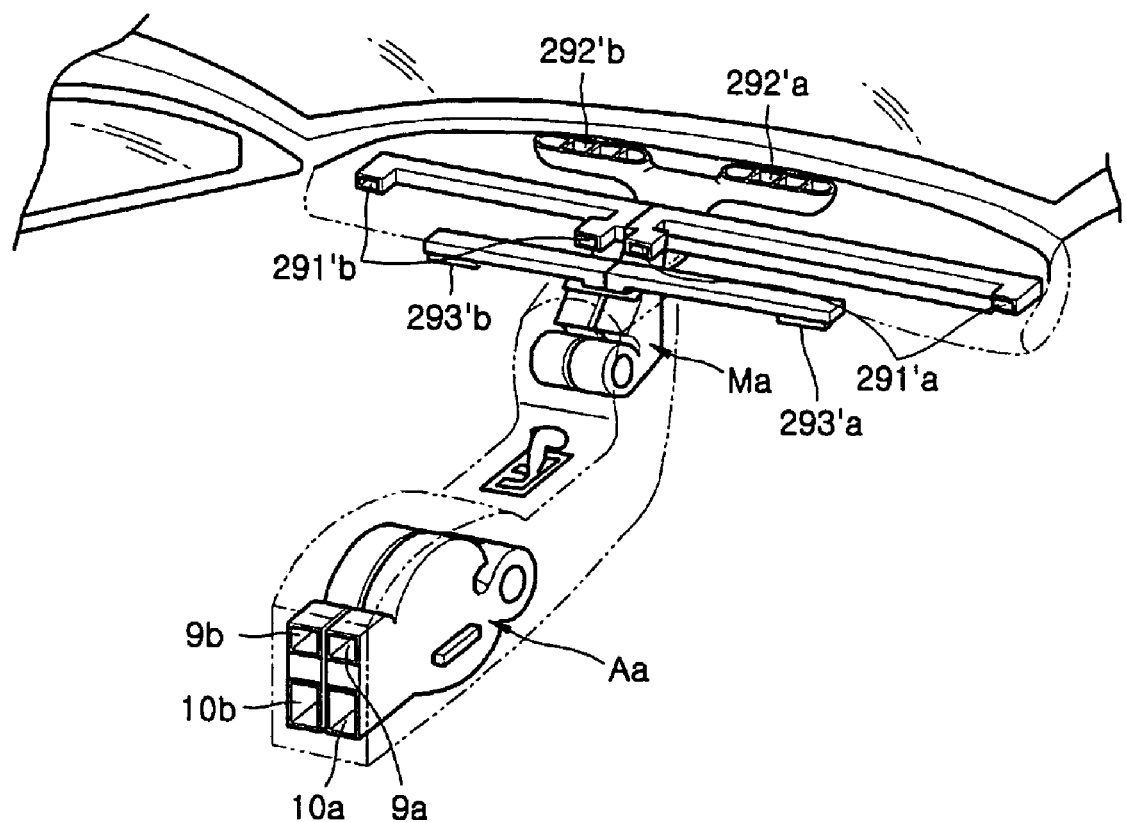
FIG. 1 is a schematic view of showing a conventional air conditioner for a vehicle.
Figure 2:
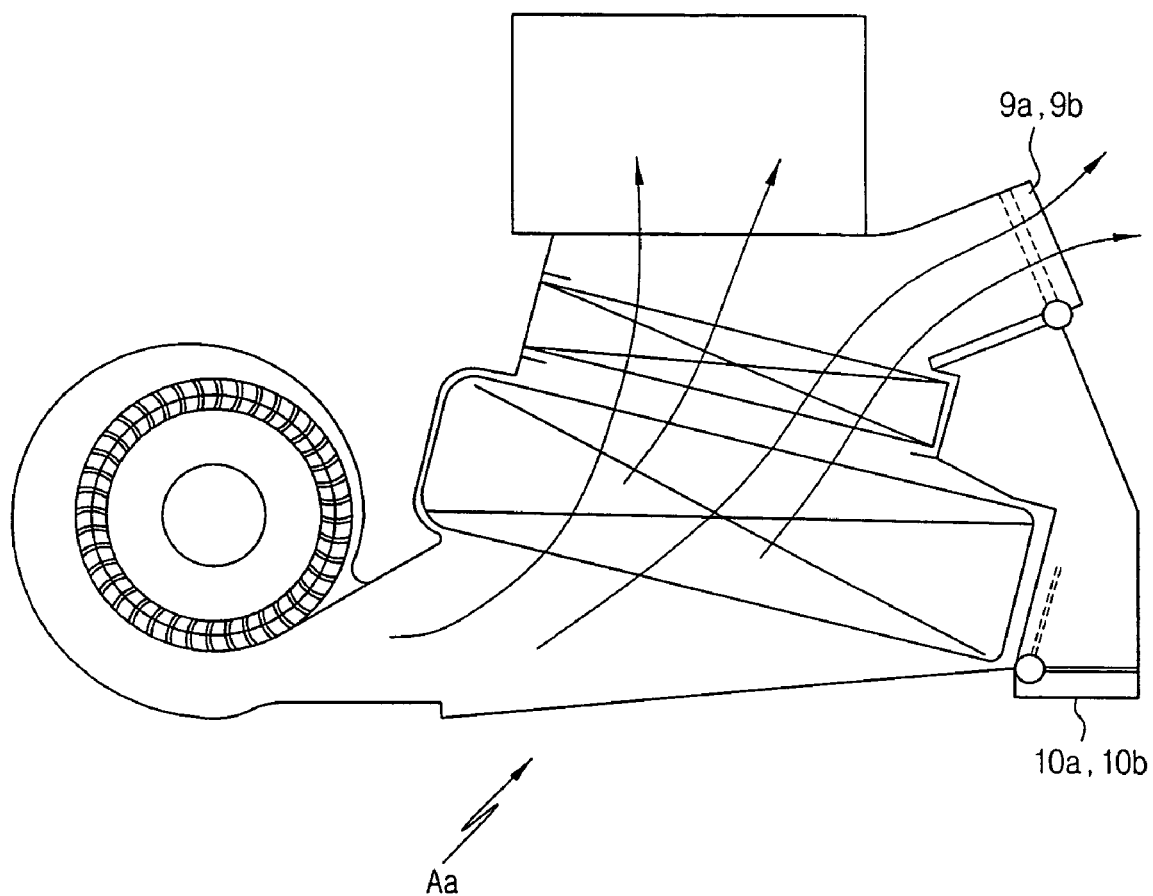
FIG. 2 is a sectional view of showing an auxiliary air conditioner used for the conventional air conditioner for the vehicle.

The air flowing from the air conditioner that is made by the afore-mentioned process is selectively blown to the defrost outlets 126a and 126b, the vent outlets 129a and 129b, and the floor outlets 130a and 130b in response to the opening and closing of the front seat mode doors 30a and 30b formed at the exit end of the front seat air conditioning casing 21. In this case, the air that flows to the defrost outlets 126a and 126b is supplied through the wind shield openings 292'a and 292'b (see FIG. 1) to the interior of the vehicle, and the air that flows to the vent outlets 129a and 129b is supplied through the side and center openings 291'a and 291'b (see FIG. 1) to the interior of the vehicle, and the air that flows to the floor outlets 130a and 130b is supplied through the floor openings 293'a and 293'b (see FIG. 1) to the interior of the vehicle. The air discharging mode is set to a defrost mode, a vent mode and a floor mode in response to the opening and closing of the outlets 126a, 126b, 129a, 129b, 130a, and 130b.

On the other hand, the front seat temperature doors 25a and 25b and the front seat mode doors 30a and 30b are formed in a symmetrical relation to each other in the two areas divided by the front seat partition wall 24 and are driven independently of each other by means of a separate actuator (not shown), such that the cooling and heating modes and the discharging mode for the two divided areas can be selected individually.

Figure 4:
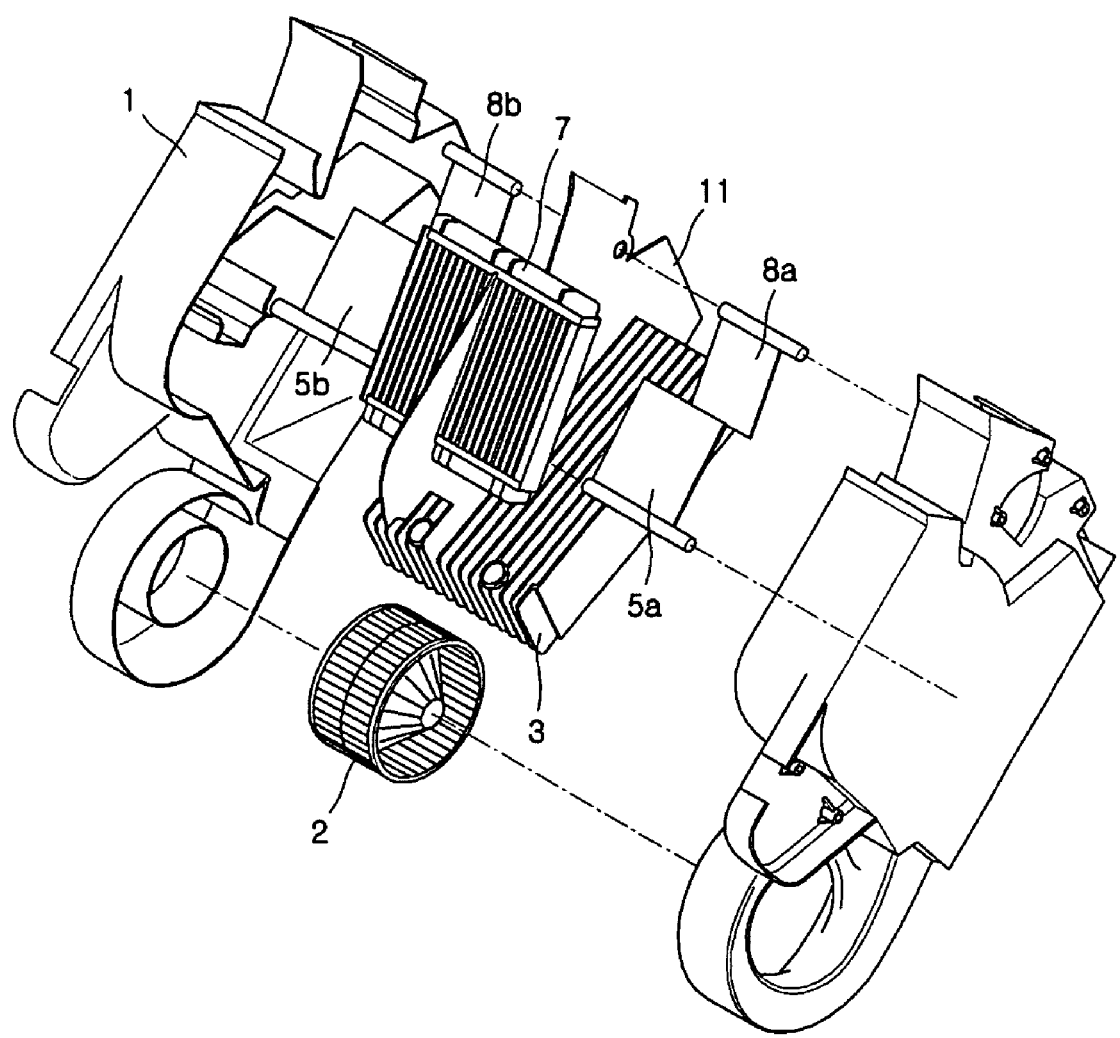
FIG. 4 is an exploded perspective view of showing a rear seat air conditioning unit constructed according to the embodiment of the present invention.
Figure 5A:
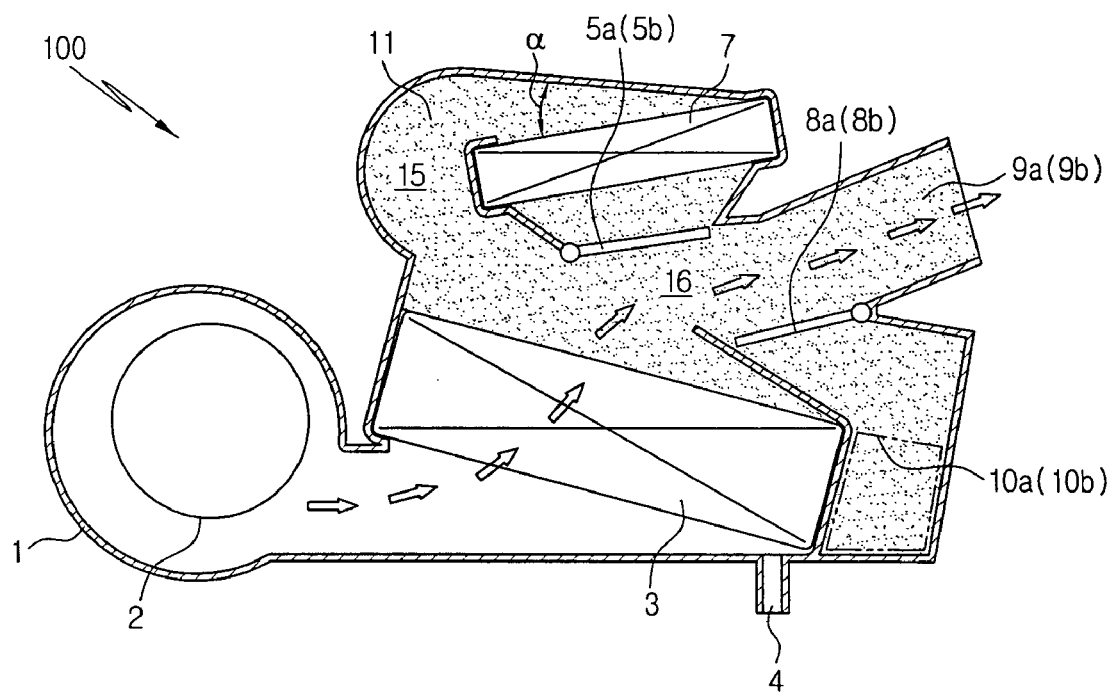
FIGS. 5a to 5f are views of showing the operations of the rear seat air conditioning unit in FIG. 4.

FIG. 4 is an exploded perspective view of showing a rear seat air conditioning unit constructed according to the embodiment of the present invention, and FIG. 5a is a sectional view of showing the operation of the rear seat air conditioning unit in FIG. 4.

As shown in FIG. 5a, the rear seat air conditioning unit 100 includes a rear seat air conditioning casing 1 in which a plurality of flow passages are arranged, a rear seat blower 2 disposed in the entry end of the rear seat air conditioning casing 1, a rear seat evaporator 3 disposed adjacent to the rear seat blower 2, and a rear seat heater core 7 disposed at the downstream of the rear seat evaporator 3, rear seat temperature doors 5a and 5b for opening and closing the flow passages formed in the rear seat air conditioning casing 1, and rear seat mode doors 8a and 8b for opening and closing outlets 9a, 9b, 10a and 10b formed at the exit end of the rear seat air conditioning casing 1.

The internal and external air, which is controlled by the rear seat blower 2 that is formed at one side of the rear seat air conditioning casing 1, flows through the plurality of flow passages in the rear seat air conditioning casing 1.

Preferably, the rear seat blower 2 has a hub (which is not shown) formed in the central portion thereof such that the internal and external air flows uniformly, without any concentration to one of the left and right sides.

The internal and external air that flows into the rear seat air conditioning unit 100 by means of the rear seat blower 2 is sent to the rear seat evaporator 3 in which the left and right sides of the upstream thereof are designed to communicate to each other, without any division. The internal and external air is heat-exchanged with the refrigerants in the rear seat evaporator 3, and as a result, it becomes cool. In this case, the refrigerants of the rear seat evaporator 3 flow from the front seat air conditioning unit 200.

In the cooling process for the internal and external air, condensed water is generated on the flow passage through which the refrigerants flow. The condensed water is discharged to the outside of the rear seat air conditioning unit 100 by the formation of a discharge outlet 4 on the bottom surface of the rear seat air conditioning casing 1.

On the other hand, a rear seat partition wall 11 is extended from the downstream of the rear seat evaporator 3 to the exit end of the rear seat air conditioning unit 100 to divide the air flow passages into left and right areas, such that the internal and external air, which is passed through the rear seat evaporator 3, is sent to the divided space portions.

As shown in FIG. 5a, the downstream of the rear seat evaporator 3 is divided into a first flow passage 15 and a second flow passage 16, and the rear seat heater core 7 is disposed on the first flow passage 15. The rear seat heater core 7 is divided into left and right areas by means of the rear seat partition wall 11.

In this case, the rear seat heater core 7 is disposed to face the upper surface of the rear seat air conditioning casing 1, and at this time, preferably, an angle a between the rear seat heater core 7 and the upper surface of the rear seat air conditioning casing 1 is set to satisfy the following expression: $10° \leq \alpha \leq 45°$.

In other words, if the angle $\alpha$ is less than 10°, the space between the rear seat air conditioning casing 1 and the rear seat heater core 7 is too small to carry out smooth air flowing, and contrarily, if the angle $\alpha$ is higher than 45°, the rear seat air conditioning casing 1 grows bigger than needed so that it is restricted to installation in the vehicle.

A volume of internal and external air that flows to the first flow passage 15 and the second flow passage 16 is controlled as a degree of opening for the rear seat temperature doors 5a and 5b rotatably coupled to the rear seat air conditioning casing 1 is adjusted. As shown in FIG. 4, the rear seat temperature doors 5a and 5b, which are disposed in a symmetrical relation to each other in the two areas divided by the rear seat partition wall 11, are driven by an actuator (which is not shown) such that each of them can be opened and closed.

The internal and external air that flows to the first flow passage 15 is sent to the rear seat heater core 7, wherein the internal and external air is heat-exchanged with the cooling water to become warm air. In this case, the cooling water is supplied from the flow passage branched from the front seat air conditioning unit 200.

The warm air that has been passed through the first flow passage 15 is mixed with the internal and external air that has been passed through the second flow passage 16, without having the heat-exchange with the cooling water, such that the mixed air becomes air conditioning wind having an appropriate temperature that satisfies the demand of occupants inside the vehicle.

In this case, the first flow passage 15 is formed at the downstream of the rear seat evaporator 3 in such a manner as to surround one side of the rear seat heater core 7 such that the air flows into the upper side portion of the rear seat heater core 7.

In other words, the air flows into the upper side portion of the rear seat heater core 7, while surrounding the one side of the rear seat heater core 7, such that it can be pre-heated to thereby improve the heating performance. In addition, the air that is passed through the rear seat heater core 7 is just supplied to the vent outlets 9a and 9b and the floor outlets 10a and 10b, without any sudden change of the air flow passage thereof, which enables the resistance of air flow passages to be considerably reduced. On the other hand, since the air resistance of the rear seat heater core 7 itself is relatively regarded as high, before the air flows into the rear seat heater core 7, the air resistance by the shape of the first flow passage 15 is less influential than that of the rear seat heater core 7.

The vent outlets 9a and 9b are formed on the upper exit end of the rear seat air conditioning unit 100, and the floor outlets 10a and 10b are formed on the lower exit end of the rear seat air conditioning unit 100, in such a manner as to be located on the left and right sides in symmetrical relation to each other.

The vent outlets 9a and 9b and the floor outlets 10a and 10b are opened and closed as the rear seat mode doors 8a and 8b that are located adjacent to them turn. The rear seat mode doors 8a and 8b are connected to a mode switch (which is not shown), serving to appropriately send the air flowing from the air conditioner to the vent outlets 9a and 9b and the floor outlets 10a and 10b in response to the manipulation of the user.

As appreciated from FIG. 4, the rear seat mode doors 8a and 8b are mounted correspondingly in the two areas divided by the rear seat partition wall 11, driven by an actuator (which is not shown) such that they send the air flowing from the air conditioner to the vent outlets 9a and 9b and the floor outlets 10a and 10b, independently of each other.

Now, an explanation of the operation of the air conditioner for the vehicle according to the preferred embodiment of the present invention is given below.

Figure 5B:
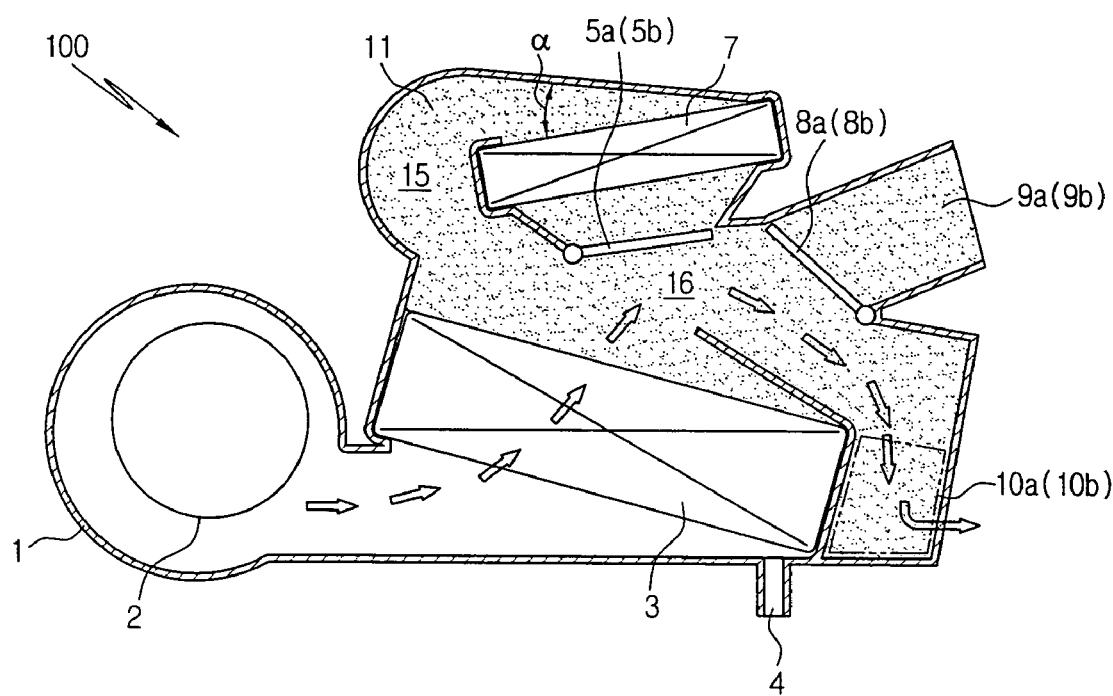

As shown in FIGS. 5a and 5b, in a cooling mode, the rear seat temperature doors 5a and 5b are fully turned to the rear seat heater core 7 side such that the cool air flowing from the rear seat blower 2 and the rear seat evaporator 3 are discharged, without the flowing of the cool air to the rear seat heater core 7. In this case, a volume of air flowing from the air conditioner to the vent outlets 9a and 9b and the floor outlets 10a and 10b is controlled in response to a degree of the opening of the vent outlets 9a and 9b and the floor outlets 10a and 10b that is controlled by means of the rear seat mode doors 8a and 8b.

Figure 5C:
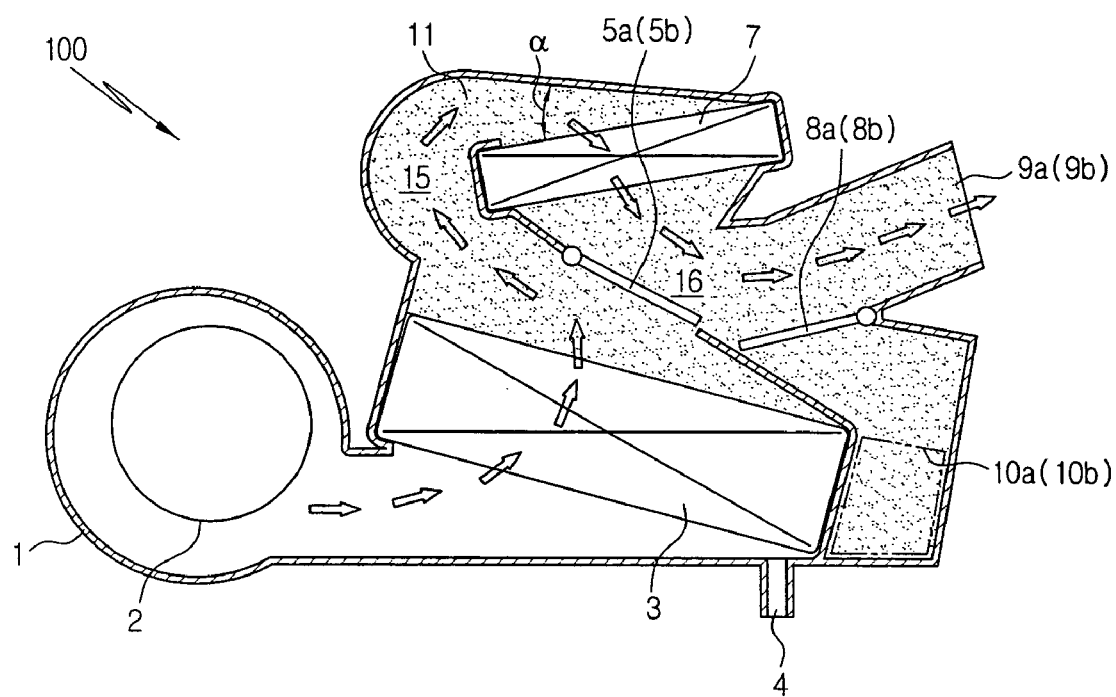
Figure 5D:
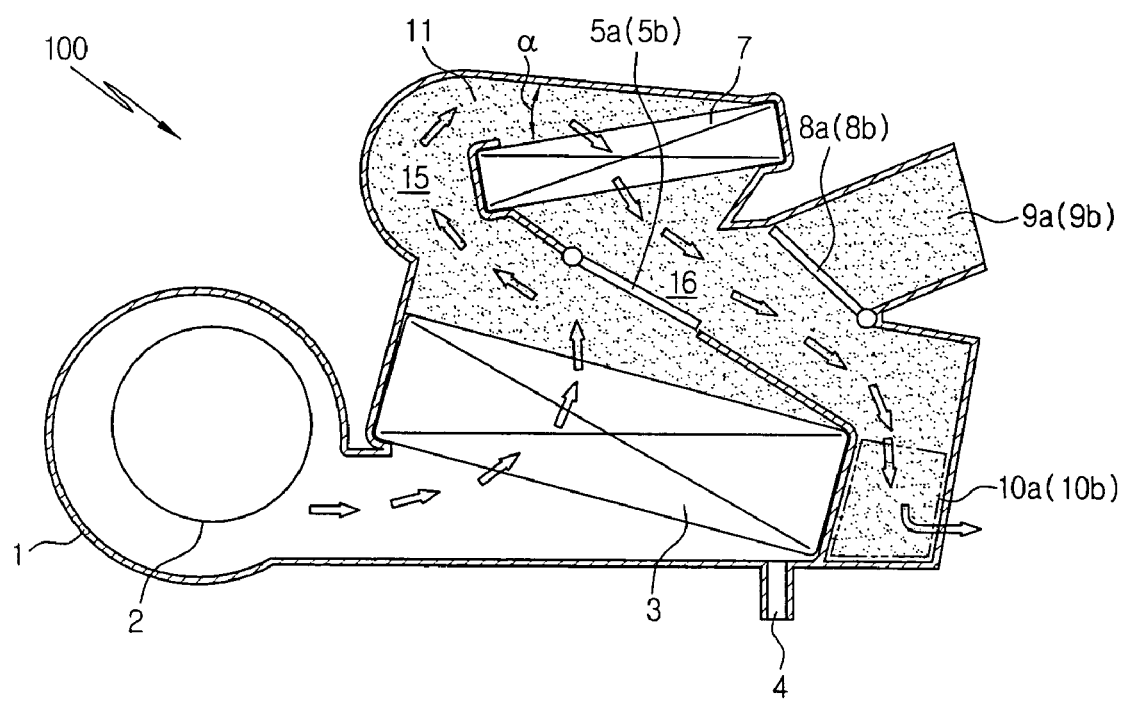

As shown in FIGS. 5c and 5d, in a heating mode, the rear seat temperature doors 5a and 5b are fully turned to the rear seat evaporator 3 side such that the internal and external air flowing from the rear seat blower 2 and the rear seat evaporator 3 is sent upwardly of the rear seat heater core 7 to become warm air. In this case, a volume of air flowing from the air conditioner to the vent outlets 9a and 9b and the floor outlets 10a and 10b is controlled in response to a degree of the opening of the vent outlets 9a and 9b and the floor outlets 10a and 10b that is controlled by means of the rear seat mode doors 8a and 8b.

Figure 5E:
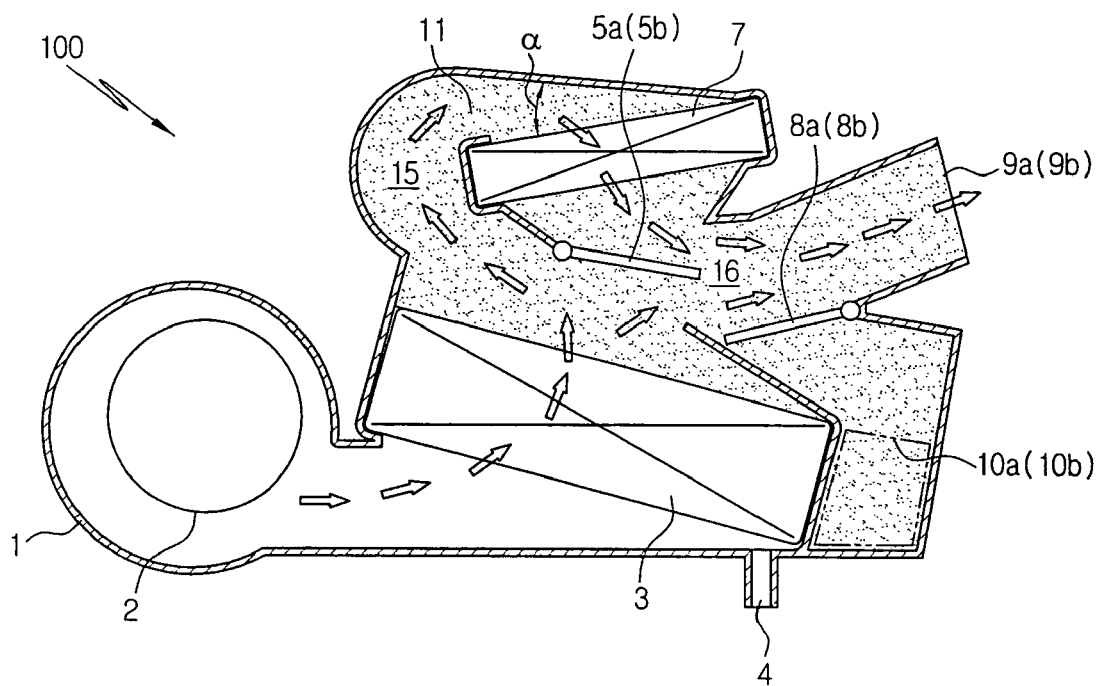
Figure 5F:
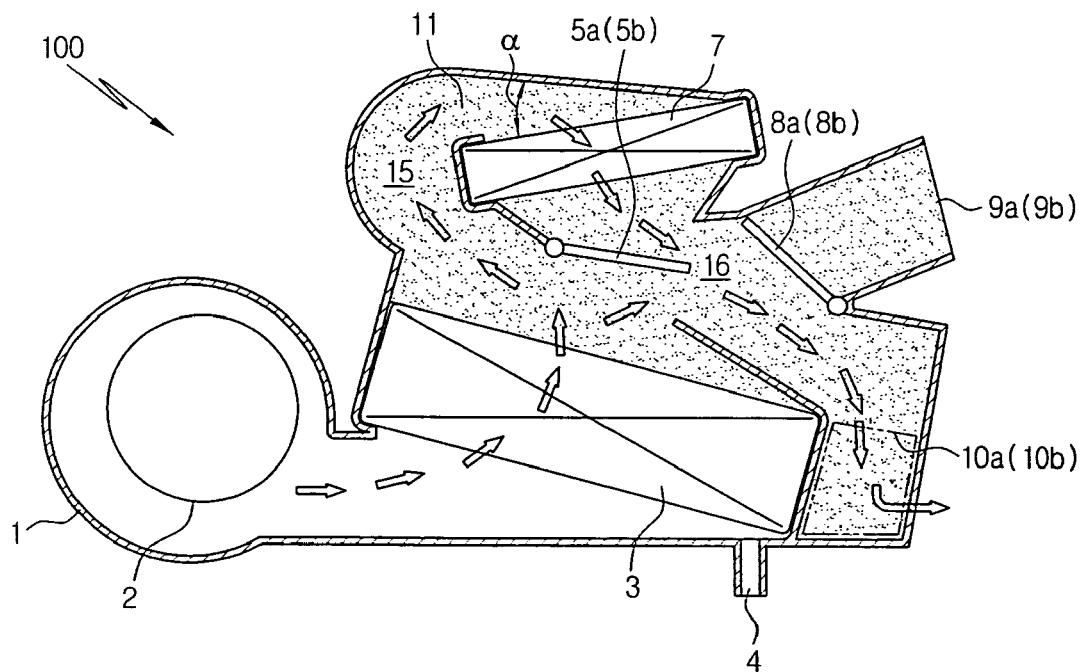

As shown in FIGS. 5e and 5f, in a temperature adjusting mode, a degree of opening of the first and second flow passages 15 and 16 is controlled by means of the rear seat temperature doors 5a and 5b, such that the low temperature of internal and external air flowing from only the rear seat evaporator 3 is admixed with the high temperature of internal and external air flowing from both of the rear seat evaporator 4 and the rear seat heater core 7, thereby providing an appropriate temperature of air in response to the need of a user.

On the other hand, the cooling and heating modes and the discharge mode are appropriately controlled for the left and right areas divided by the rear seat partition wall 11 as the rear seat temperature doors 5a and 5b and the rear seat mode doors 8a and 8b are driven independently to one another.

As described above, according to the present invention, so as to conduct the air-conditioning for the rear seats, the front seat air conditioning unit 200 and the rear seat air conditioning unit 100 are connected to each other such that the rear seat air conditioning unit 100 can be compacted, which makes it possible to be mounted on even relatively small space.

According to the present invention, the front seat partition wall 24 and the rear seat partition wall 11 serve to divide the flow passages from the evaporator to the exit end into the left and right sides, and the temperature doors 25a, 25b, 5a, and 5b and the mode doors 30a, 30b, 8a, and 8b that are located in symmetrical relation to each other to the left and right sides of the front and rear seat partition walls 24 and 11 are driven independently to each other, such that the cooling and heating can be individually controlled for all of the front and rear areas and the left and right areas.

Moreover, the rear seat air conditioning unit 100 is driven for the left and right areas, individually, while each of the rear seat evaporator 3 and the rear seat heater core 7 is formed as a single body, without any division into two parts, such that the refrigerants and the cooling water are circulated through an input and an outlet, without having a plurality of flow passages that are branched from the front seat air conditioning unit 200. This prevents the installation space and the production cost for the plurality of flow passages from being unnecessarily consumed.

According to the present invention, additionally, the temperature of the air flowing from the air conditioner is controlled by the opening and closing and the degree of the opening of the rear seat temperature doors 5a and 5b, and therefore, when compared to a method of controlling the temperature by the switching operation of a water valve or a solenoid valve, the temperature of the air can be controlled at a relatively faster speed such that upon adjustment of temperature, a user can feel the change of the temperature rapidly.

Figure 6:
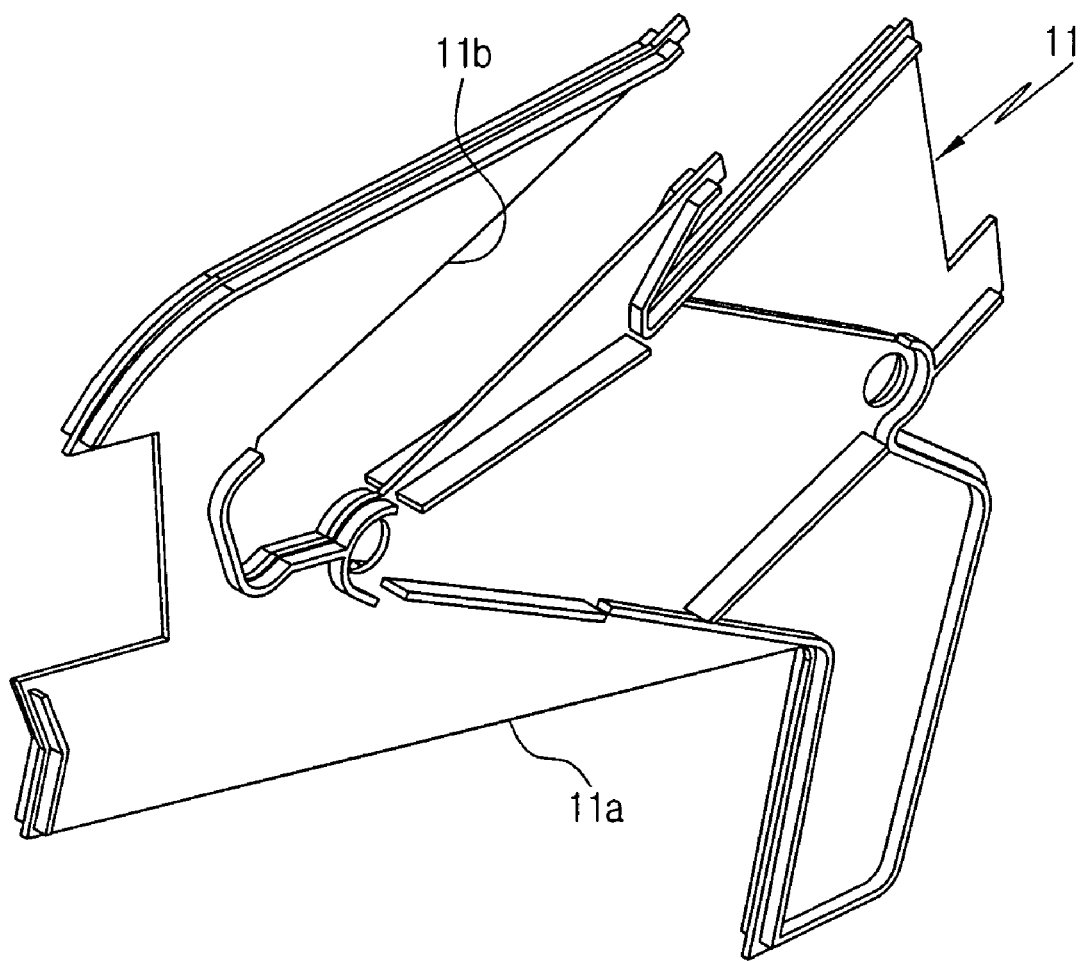
FIG. 6 is a view of showing a rear seat partition wall in the rear seat air conditioning unit in FIG. 4.

FIG. 6 is a view of showing a rear seat partition wall in the rear seat air conditioning unit in FIG. 4. The rear seat partition wall 11 is located to the central portions of the rear seat evaporator 3 and the rear seat heater core 7 such that the two divided areas of air flow passages can be uniformly formed into the left and right sides. Further, the rear seat partition wall 11 includes an insertion portion 11a into which the rear seat evaporator 3 is inserted and an insertion portion 11b into which the rear seat heater core 7 is inserted.

On the other hand, the rear seat partition wall 11 in FIG. 6 is described as one example, and it may be freely changed in shape according to the shape of the rear seat air conditioning casing 1.

Figure 7:
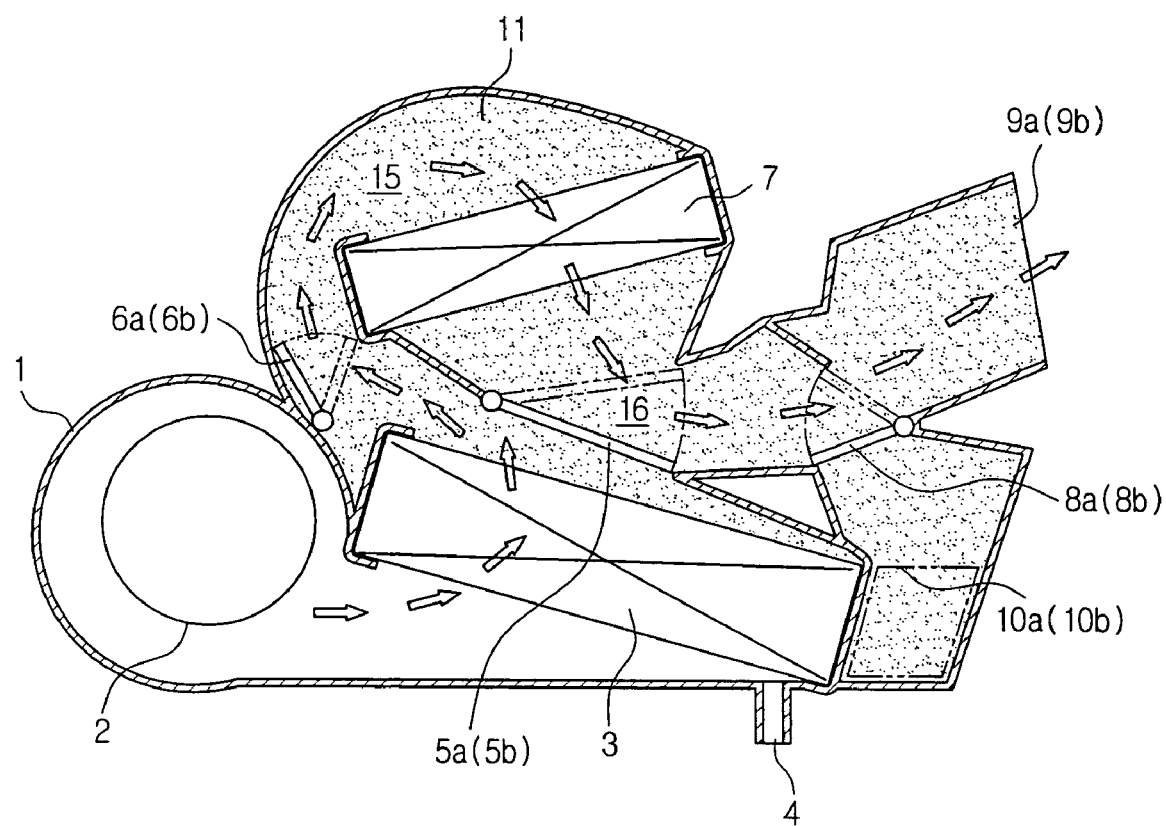
FIG. 7 is a sectional view of showing a rear seat air conditioning unit constructed according to another embodiment of the present invention.

FIG. 7 is a sectional view of showing a rear seat air conditioning unit constructed according to another embodiment of the present invention. The rear seat partition wall 11 is extended from the downstream of the rear seat evaporator 3 to the exit end of the rear seat air conditioning casing 1, and the flow passage formed at the downstream of the rear seat evaporator 3 is divided into first and second flow passages 15 and 16. The rear seat heater core 7 is provided on the first flow passage 15, and the internal and external air flowing to the first and second flow passages 15 and 16 is controlled in response to the adjustment of a degree of opening for the rear seat temperature doors 5a and 5b formed at the downstream of the rear seat heater core 7.

Further, sub-temperature doors 6a and 6b are formed at the upstream of the rear seat heater core 7 in such a manner as to be operated in cooperation with the rear seat temperature doors 5a and 5b as the rear seat temperature doors 5a and 5b are turned. In more details, as shown, if the first flow passage 15 is opened by means of the rear seat temperature doors 5a and 5b to flow the internal and external air to the rear seat heater core 7, the sub-temperature doors 6a and 6b are accordingly opened. To the contrary, if the first flow passage 15 is closed by means of the rear seat temperature doors 5a and 5b, the sub-temperature doors 6a and 6b are accordingly opened such that the internal and external air does not flow to the rear seat heater core 7 and moves along the second flow passage 16.

In this case, a device of making the rear seat temperature doors 5a and 5b engaged with the sub-temperature doors 6a and 6b is employed, for example, with a link mechanism (which is not shown).

As described above, the formation of the sub-temperature doors 6a and 6b prevents a high temperature of air flowing from the rear seat heater core 7 from leaking.

Figure 8:
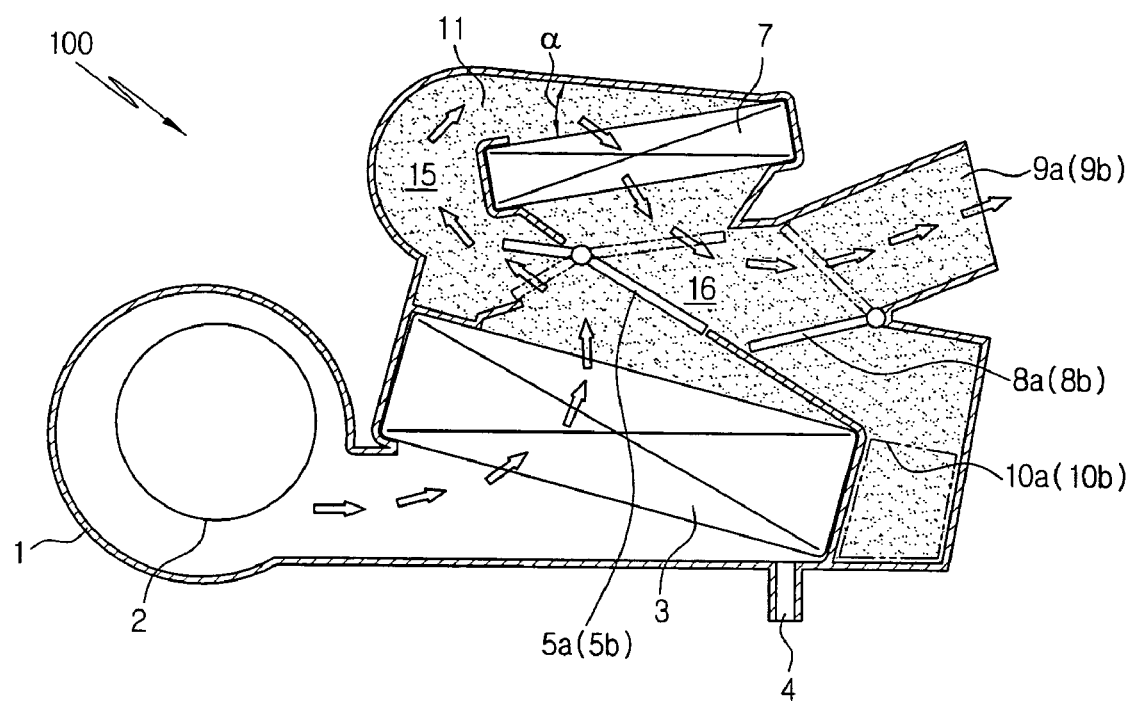
FIG. 8 is a sectional view of showing a rear seat air conditioning unit constructed according to still another embodiment of the present invention.

FIG. 8 is a sectional view of showing a rear seat air conditioning unit constructed according to still another embodiment of the present invention. Referring to FIG. 8, the rear seat partition wall 11 is extended downwardly of the rear seat evaporator 3 and to the exit end of the rear seat air conditioning casing 1, and the flow passage formed downwardly of the rear seat evaporator 3 is divided into first and second flow passages 15 and 16. The rear seat heater core 7 is provided on the first flow passage 15, and the internal and external air flowing to the first and second flow passages 15 and 16 is controlled in response to the adjustment of a degree of opening for the rear seat temperature doors 5a and 5b formed downwardly of the rear seat heater core 7.

In this case, preferably, the rear seat temperature doors 5a and 5b are pivot doors, each of which having a rotary shaft formed in the inner side of a door plate thereof.

In other words, according to another embodiment of the present invention as shown in FIG. 7, the sub-temperature doors 6a and 6b are separately mounted at the upstream of the rear seat heater core 7 to prevent a high temperature of air flowing from the rear seat heater core 7 from leaking in the cooling mode. On the other hand, according to still embodiment of the present invention as shown in FIG. 8, the sub-temperature doors 6a and 6b are not mounted and instead of them, the rear seat temperature doors 5a and 5b of a pivot door type is employed therein.

On the other hand, the construction and operation of the rear seat air conditioning unit 100 in FIG. 8 are carried out in the same manner as in FIG. 7, except that the rear seat air conditioning unit 100 as shown in FIG. 8 has the pivot door type of rear seat temperature doors 5a and 5b.

As described above, an air conditioner for a vehicle according to the preferred embodiments of the present invention includes the front seat air conditioning unit having the front seat partition wall mounted therein and the rear seat air conditioning unit having the rear seat partition wall mounted therein, the front and rear seat partition walls having the front and rear seat temperature doors and the front and rear seat mode doors that are located in a symmetrical relation to each other formed at the left and right sides thereof and driven individually, whereby cooling and heating is carried out for the front and rear areas and the left and right areas, independently of one another.

According to the preferred embodiments of the present invention, an air conditioner for a vehicle works in a multi-zone controlling manner, while each of an evaporator and a heater core is formed as a single body, without any division into two parts, such that working fluid like refrigerants and cooling water is circulated through an input and an outlet, without having a plurality of flow passages that are branched from the front seat air conditioning unit, whereby the rear seat air conditioning unit can be compacted.

According to the preferred embodiments of the present invention, the temperature of the air flowing from the air conditioner is controlled in response to the opening and closing and the degree of opening of the temperature doors, and therefore, when compared to a method of controlling the temperature by incoming and outgoing the working fluid by the switching operation of a valve, the temperature of the air can be controlled at a relatively faster manner such that upon adjustment of temperature, a user can feel the change of the temperature rapidly.

According to the preferred embodiments of the present invention, also, the discharge mode of the rear seat air conditioning unit is carried out by each of the two rear seat mode doors formed in the two areas divided by the rear seat partition wall.

According to the preferred embodiments of the present invention, in addition, in the heating mode the air flows upwardly of the rear seat heater core, surrounding the rear seat heater core, which enables the heating performance to be greatly improved, and after that, the air that is passed through the rear seat heater core is just supplied to the vent outlets or the floor outlets, without any drastic change of the flow passage thereof, which enables the resistance of air flow passages to be considerably reduced.

While the present invention has been described with reference to the particular illustrative embodiments, it is not to be restricted by the embodiments but only by the appended claims, and therefore, it is to be understood that other modifications and variations may be made without departing from the substance and scope of the present invention, as those skilled in the art will readily understand. Such alternate modifications and variations are within the scope of the present invention which is intended to be limited only by the appended claims and equivalents thereof.

What is claimed is:

1. An air conditioner for a vehicle comprising:
a front seat air conditioning unit having a front seat air conditioning casing provided with a front seat evaporator and a front seat heater core disposed on air flow passages therein, with vent outlets, defrost outlets and floor outlets disposed at an exit end thereof for discharging the air flowing to the front seats of the vehicle, with a front seat partition wall for dividing the air flow passages into two areas, with front seat temperature doors for individually controlling the temperatures of the two areas divided by the front seat partition wall, with front mode doors for controlling the degree of opening of the vent outlets, the defrost outlets and the floor outlets and with the front seat blower for blowing the air to the front seat air conditioning casing; and a rear seat air conditioning unit having a rear seat air conditioning casing provided with a rear seat evaporator disposed in substantially in the horizontal direction to air flow passages therein, with a rear seat heater core disposed on the upper side of the rear seat evaporator, with vent outlets and floor outlets disposed at an exit end thereof for discharging the air flowing to the rear seats of the vehicle, with a rear seat partition wall for dividing the air flow passages into two areas, with rear seat temperature doors disposed between the rear seat evaporator and the rear seat heater core, for individually controlling the temperatures of the divided areas by the rear seat partition wall, with rear seat mode doors disposed adjacent to the vent outlets and the floor outlets for controlling the degree of opening of the vent outlets and the floor outlets, and with a rear seat blower for blowing the air to the rear seat air conditioning casing, whereby in a heating mode, air flows into the upper side portion of the rear seat heater core while passing through the rear seat heater core so as to be discharged to the rear seats of the vehicle.

2. An air conditioner for a vehicle as claimed in claim 1, wherein a degree of opening of the vent outlets and the floor outlets of the rear seat air conditioning casing is controlled by each of the rear seat mode doors mounted in the divided two areas.

3. An air conditioner for a vehicle as claimed in claim 1, wherein the rear seat air conditioning unit further comprises sub-temperature doors that are operated in cooperation with the rear seat temperature doors.

4. An air conditioner for a vehicle as claimed in claim 1, wherein the rear seat temperature doors are pivot doors each having a rotary shaft formed in the inner side of a door plate thereof.

5. An air conditioner for a vehicle as claimed in claim 1, wherein the rear seat partition wall is located to the central portions of the rear seat evaporator and the rear seat heater core such that the two divided areas of air flow passages can be uniformly formed to the left and right sides, the rear seat partition wall having insertion portions into which the rear seat evaporator and the rear seat heater core are inserted.

6. An air conditioner for a vehicle as claimed in claim 1, wherein the rear seat heater core is disposed to face the upper surface of the rear seat air conditioning casing.

7. An air conditioner for a vehicle as claimed in claim 6, wherein an angle ($\alpha$) between the rear seat heater core and the upper surface of the rear seat air conditioning casing is set to satisfy the following expression: $10° \leq \alpha \leq 45°$.

8. An air conditioner for a vehicle as claimed in claim 1, wherein the rear seat air conditioning casing internally has a first flow passage formed at the downstream of the rear seat evaporator in such a manner as to surround one side of the rear seat heater core such that the air flows into the upper side portion of the rear seat heater core.

* * * * *